Figure 1:
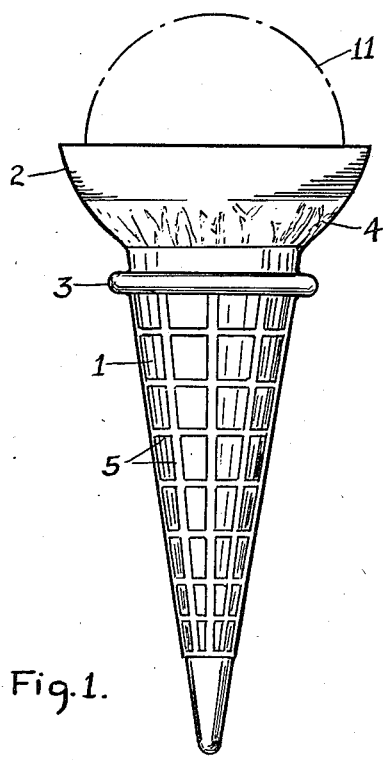

April 28, 1942.  W. W. TURNBULL  2,281,217
REINFORCED CONE
Filed Aug. 26, 1940

INVENTOR
Werd W. Turnbull
BY Carmack Waterhouse
ATTORNEY

Patented Apr. 28, 1942

2,281,217

UNITED STATES PATENT OFFICE 2,281,217

REINFORCED CONE

Werd W. Turnbull, Chattanooga, Tenn.

Application August 26, 1940, Serial No. 354,233

4 Claims. (Cl. 99—89)

My invention relates to pastry cups and more particularly to ice cream cones of the type employing reinforced tops, and is an improvement over the patents to Turnbull 2,155,106 and Kohr 1,783,799.

It is well known that cream is applied to the top of a cone with considerable pressure, and that in order to withstand such pressure, the top portion of the cone must be of greater strength and have greater resistance than the body, which is not subject to the greater pressure and does not carry the full load of the ice cream. With this in mind it was early attempted to provide a cone by thickening the top which would provide the requisite strength. In doing this it was found that if thickened sufficiently to provide the desired strength it became so thick that it would not bake evenly with the body of the cone and would be doughy when the body was properly baked. To overcome this defect a top made up of spaced inner and outer rings bridged by a series of ribs was developed. In that way a mold could be developed which would provide heat for baking on either side of the rings and ribs, baking the top evenly and uniformly with the body of the cone, thereby producing a cone with a strong reinforced top. Such top was also designed to more efficiently retain the cap of cream thereon, and depended both on the suction from cups or recesses defined by the rings and ribs, as well as the mechanical cooperation between the rings, ribs and ice cream.

Since the consistency and hardness of the cream determined to a considerable extent the retention powers of the cone, and since hard or firm cream must be pressed with great pressure on the blunt edges of these elements, they would at times become injured from the pressure necessary to seat the cap of cream on the cone or the cap of cream would not become firmly seated thereon. It was further found that in dispensing cones from nested stacks, the rib on one cone when resting in the recessed wall of the body of another would, due to weather conditions, cause the cones to stick together and breakage to occur.

Attempts have also been made in the art to provide a dripless cone by employing a broken inner ring made up of spaced segments which projected above the outer ring Kohr, supra. However contact with external objects and pressure applied to their blunt edges in seating cream thereon as well as relative movement of nested cones had a tendency to injure or destroy those segments.

Applicant with a knowledge of these defects and objections to the prior art has for an object of his invention the provision of an ice cream cone with a reinforced top for the reception of a cap of cream and having portions so shaped as to easily seat in a portion of the cap and retain it against removal.

Applicant has as another object of his invention the provision of an ice cream cone with an outer lip having inclined curved surfaces for engagement with a cap of ice cream to urge it toward the center of the top of the cone and prevent its removal.

Applicant has as another object of his invention the provision of an ice cream cone having a top with spaced inner and outer ring bridged by a series of spaced ribs defining pockets, with depressions in the inner ring to permit the flow of liquid resulting from the melting of cream into the body of the cone and providing a series of spaced upstanding pointed projections for seating in and retaining a cap of cream on the top of the cone.

Applicant has as a further object of his invention the provision of a cone having a reinforced top with an outer lip and a series of spaced upstanding projections defining a broken inner ring, which projections terminate at their upper ends for engaging in a cap of ice cream to prevent its removal.

Applicant has as a further object of his invention the provision of a reinforced dripless top ice cream cone.

Applicant has as a further object of his invention the provision of a reinforced top cone for the reception of a cap of cream within its outer lip to catch the dripping of ice cream and to retain the cap of cream in position.

Applicant has as a still further object of his invention the provision of an ice cream cone carrying a supporting rib on its body for engagement with top of an adjacent cone when nested in a stack to space it therefrom and to prevent sticking.

Other objects and advantages of my invention will appear from the following specification and accompanying drawing, and the novel features thereof will be particularly pointed out in the annexed claims.

Figure 2:
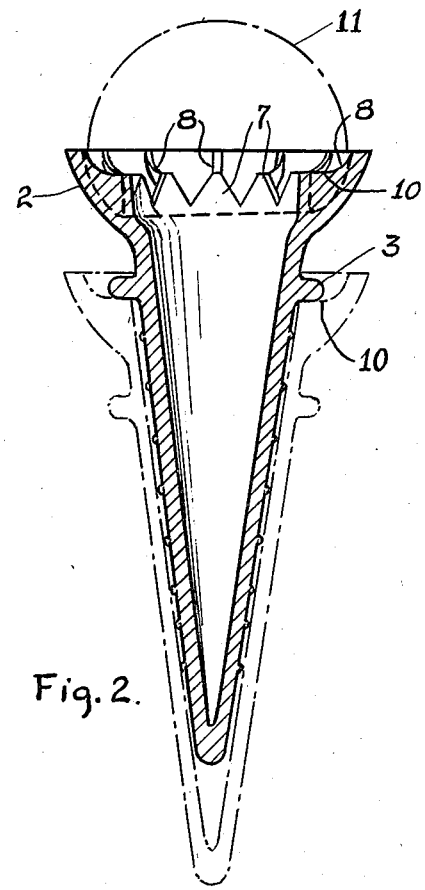
Figure 3:
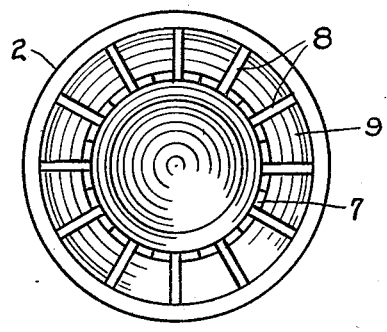

In the drawing Figure 1 is a front elevation of my improved ice cream cone. Figure 2 is a longitudinal sectional view showing how my improved cone nests with others. Figure 3 is a plan view of the cone of Figure 1.

Referring to the drawing in detail, I designates the conical body of a pastry cup or ice cream cone of substantially uniform thickness terminating at its upper end in a top having an outer mouth or ring 2 flaring out over the body 1. Disposed within the outer mouth or ring 2 and upstanding from the cone body 1 is a short inner lip or ring having circumferentially spaced saw teeth projections 7 extending upwardly therefrom and terminating below the upper edge of the outer ring 2. Bridging the space between the inner and outer rings and joining the inner ring and its projections 7, 7 to the outer ring 2 are a series of spaced ribs 8, 8 extending up to and arcuately from the tops of the projections 7, 7 to the upper edge of the outer ring, and the major curvature of the radial ribs being adjacent the outer mouth 2. The spaced ribs 8, 8 bridging the inner lip and outer mouth define recesses 9, 9 and when the cap of cream 11 is properly positioned on the top, act as suction cups to assist in retaining the cream in place.

The cap of cream 11 is pressed down on the top of the cone so that the ribs 8, 8 and extensions 7, 7 seat in and assist in the retention of the cap of cream in place. Drippings are caught by the mouth 2 and directed in to the chambers 9, 9 between the mouth 2 and cap 11, and from there to the body 1 of the cone passing between the extension 7, 7.

The outer surface of the body 1 of the cone has a series of circumferential and longitudinal ribs 5 positioned in intersecting spaced relation to each other which begin adjacent the lower end of the cone and terminate below the top of the cone and spaced therefrom in an enlarged peripheral rib 3 whose lower face is adapted to rest upon radial ribs 8 and projections 7, 7 of the next adjacent cone telescoped about it when in nested relation, and serves as a means of support for the cone when so nested, spacing the top thereof away from the top of the adjacent cone to facilitate the dispensing of cones from a stack. On the other hand the intersecting ribs 5, 5 serve both as an ornament creating a design on the outer surface of the cone body, and also as a means for spacing the cone body from contact with the next adjacent cone telescoped over it when in nested relation and reduces the tendency to stick together.

From the foregoing it is seen that by the use of spaced continuous inner and outer rings bridged by radial ribs a top of greater thickness and strength than the body 1 is obtained, and that by the use of converging projections 7, 7 from the inner ring points are created at the tops thereof which will pierce the cap of cream and retain it thereon without injury while providing passages from the chambers or recesses 9, 9 to the body of the cone for removal of cream drippings or melted cream. The lowering of the inner lip permits the cap 11 of cream to be positioned within the outer mouth 2 which serves to retain the cap in place and to direct the drippings into chambers or recesses 9, 9. The inner surface of the outer mouth 2 extends downwardly from the upper edge thereof in an arcuate path which urges the cap 11 toward the center of the top 2 and the drippings towards the body 1 of the cone. The upwardly converging projections 7, 7 create outlets from chambers 9, 9 to the body 1 without breaking the inner ring at a sacrifice of strength, and are not of such configuration as to be easily broken by other objects and are able to take maximum advantages of the protection offered by ribs 8, 8 and mouth 2.

Furthermore the formation of converging projections permits the use of molds of such configuration as to permit the ready escape of steam and insure the complete and proper formation of the projections.

Having thus described my invention, I claim:

1. A pastry cup of the character described comprising a hollow body portion, a top portion integrally secured to the upper end thereof and including a continuous outer mouth and a continuous inner lip spaced from said mouth, a series of projections extending upwardly from the lip for engagement with and retention of the contents of the cup, and ribs bridging the space between said lip and projections and said mouth to strengthen said top.

2. A pastry cup of the character described comprising a hollow body portion, a top portion integrally secured to the upper end thereof and including a continuous mouth and a continuous inner lip spaced from said mouth, a series of projections extending upwardly from the lip for engagement with and retention of the contents of the cup, and ribs bridging the space between said lip and projections and said mouth to strengthen said top, the tops of the ribs being substantially continuous with the tops of the projection and mouth.

3. A pastry cup of the character described comprising a hollow body portion, a top integrally secured to the upper end thereof and including a continuous outer mouth and a continuous inner lip spaced therefrom, spaced projections extending upwardly from said lip, said lip and projections being of less height than said mouth, whereby to engage and retain the contents positioned within said mouth, and arcuate ribs bridging the space between said mouth and said lip to reinforce it.

4. A pastry cup of the character described comprising a hollow body portion, a top portion integrally secured to the upper end thereof and including a continuous outer mouth and a continuous inner lip spaced therefrom, spaced projections carried by said lip and converging upwardly terminating in points, said lip and projections being of less height than said mouth, whereby to engage and retain the contents of said cup, and ribs bridging the space between said lip and projections and said mouth and curving downwardly from the top of the mouth to the tops of the projections to direct the cream toward the center of the cone.

WERD W. TURNBULL.